United States Patent
Hwang et al.

(10) Patent No.: US 9,559,812 B2
(45) Date of Patent: Jan. 31, 2017

(54) METHOD AND TERMINAL FOR PERFORMING HARQ

(71) Applicant: LG ELECTRONICS INC., Seoul (KR)

(72) Inventors: Daesung Hwang, Anyang-si (KR); Dongyoun Seo, Anyang-si (KR); Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 14/414,693

(22) PCT Filed: Jun. 26, 2013

(86) PCT No.: PCT/KR2013/005663
§ 371 (c)(1),
(2) Date: Jan. 13, 2015

(87) PCT Pub. No.: WO2014/017746
PCT Pub. Date: Jan. 30, 2014

(65) Prior Publication Data
US 2015/0195062 A1    Jul. 9, 2015

Related U.S. Application Data

(60) Provisional application No. 61/676,341, filed on Jul. 27, 2012.

(51) Int. Cl.
*H04L 1/18* (2006.01)
*H04L 1/16* (2006.01)
*H04L 5/00* (2006.01)

(52) U.S. Cl.
CPC ........... *H04L 1/1861* (2013.01); *H04L 1/1607* (2013.01); *H04L 5/001* (2013.01)

(58) Field of Classification Search
None
See application file for complete search history.

(56) References Cited

U.S. PATENT DOCUMENTS

2004/0219917 A1    11/2004  Love et al.
2011/0235599 A1*    9/2011  Nam ............... H04L 1/0027
                                              370/329

(Continued)

FOREIGN PATENT DOCUMENTS

KR    10-2012-0030839    3/2012

OTHER PUBLICATIONS

PCT International Application No. PCT/KR2013/005663, Written Opinion of the International Searching Authority dated Oct. 11, 2013, 1 page.

*Primary Examiner* — Duc Duong
(74) *Attorney, Agent, or Firm* — Lee Hong Degerman Kang Waimey

(57) ABSTRACT

One disclosure of the present invention provides a method for performing a HARQ in a carrier aggregation. The method can comprise a step of receiving setting information with respect to a plurality of cell groups for setting a HARQ ACK/NACK, wherein each of the plurality of cell groups can comprise one or a plurality of serving cells. The method may comprise the steps of: allocating a number of bits of the HARQ ACK/NACK to cell group units, in accordance with the setting information; and transmitting the HARQ ACK/NACK to a relevant cell group in accordance with the number of bits of the HARQ ACK/NACK that are allocated.

12 Claims, 17 Drawing Sheets

(56) References Cited

U.S. PATENT DOCUMENTS

| | | |
|---|---|---|
| 2012/0076077 A1 | 3/2012 | Buckley et al. |
| 2012/0082075 A1 | 4/2012 | Luo et al. |
| 2012/0113944 A1 | 5/2012 | Yang et al. |
| 2012/0176947 A1* | 7/2012 | Xi .................. H04L 1/0026 370/311 |
| 2013/0064180 A1* | 3/2013 | Bergman .......... H04L 1/0072 370/328 |
| 2013/0114472 A1* | 5/2013 | Tamaki ............ H04L 1/1854 370/280 |
| 2013/0242816 A1* | 9/2013 | He .................. H04L 5/1469 370/280 |
| 2013/0301433 A1* | 11/2013 | Yin .................. H04W 16/02 370/252 |
| 2014/0064159 A1* | 3/2014 | Larsson ............ H04L 1/1607 370/280 |
| 2015/0085714 A1* | 3/2015 | Liang .............. H04L 1/1614 370/280 |

* cited by examiner

METHOD AND TERMINAL FOR PERFORMING HARQ

CROSS-REFERENCE TO RELATED APPLICATIONS

This application is the National Stage filing under 35 U.S.C. 371 of International Application No. PCT/KR2013/005663, filed on Jun. 26, 2013, which claims the benefit of U.S. Provisional Application Ser. No. 61/676,341, filed on Jul. 27, 2012, the contents of which are all hereby incorporated by reference herein in their entirety.

FIELD OF THE INVENTION

The present invention relates to wireless communication, and more particularly, to a method and a terminal for performing HARQ in a wireless communication system.

RELATED ART

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels are used in transmission of various uplink control information such as a hybrid automatic repeat request (HARQ) ACK/NACK, channel state information (CSI), and a scheduling request (SR).

Radio resources for the uplink channels are more limited than radio resources for the downlink channels, a transmission error of the uplink control information may degrade service quality, and as a result, the design of the uplink channels needs to consider the transmission error.

SUMMARY OF THE INVENTION

The present invention provides a method and an apparatus for transmitting uplink control information.

In order to achieve the object, in an aspect, there is a provided a method for performing HARQ in carrier aggregation, the method comprising: receiving configuration information for a plurality of cell groups for configuring a HARQ ACK/NACK, each of the plurality of cell groups including one or a plurality of serving cells; allocating the number of bits of the HARQ ACK/NACK by a cell group unit according to the configuration information; and transmitting the HARQ ACK/NACK for the corresponding cell group according to the number of bits of the allocated HARQ ACK/NACK.

In the transmitting, the HARQ-ACK/NACK may be transmitted by using the PUCCH format suitable for the number of bits.

The configuration information may be received through an RRC signal.

The serving cells included in the group may do not simultaneously schedule resources for the uplink data. The cells included in the group may have the same transmission mode.

In the allocating, N bits per downlink subframe for the HARQ-ACK/NACK are considered with respect to each group. Or, in the allocating, the number of bits is allocated by considering the largest number among numbers of transport blocks of cells included in each group. Or, in the allocating, the number of bits is allocated by considering the activated cell among the cells included in each group. Or, in the allocating, in the case of TDD, the number of bits is allocated by considering a cell having the most number of downlink subframes The HARQ ACK/NACK is transmitted on one uplink channel for each cell group.

One cell group of the plurality of cell groups includes a primary cell and other cell groups include secondary cells.

In order to achieve the object, in an aspect, there is an user equipment (UE) for performing HARQ in carrier aggregation, the UE comprising: an RF unit configured to receive configuration information for a plurality of cell groups for configuring a HARQ ACK/NACK, each of the plurality of cell groups including one or a plurality of serving cells; and a processor configured to allocate the number of bits of the HARQ ACK/NACK by a cell group unit according to the configuration information and transmit the HARQ ACK/NACK for the corresponding cell group according to the number of bits of the allocated HARQ ACK/NACK.

In the case where a plurality of cells is configured, the number of bits for HARQ-ACK/NACK may be efficiently configured to more efficiently use resources.

DESCRIPTION OF EXEMPLARY EMBODIMENTS

A wireless device may be fixed or have mobility, and may be called as other terms such as user equipment (UE), a mobile station (MS), a user terminal (UT), a subscriber station (SS), and a mobile terminal (MT). A base station generally represents a fixed station that communicates with the wireless device, and may be called other terms such as an evolved-NodeB (eNB), a base transceiver system (BTS), an access point, and the like.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

Figure 1:
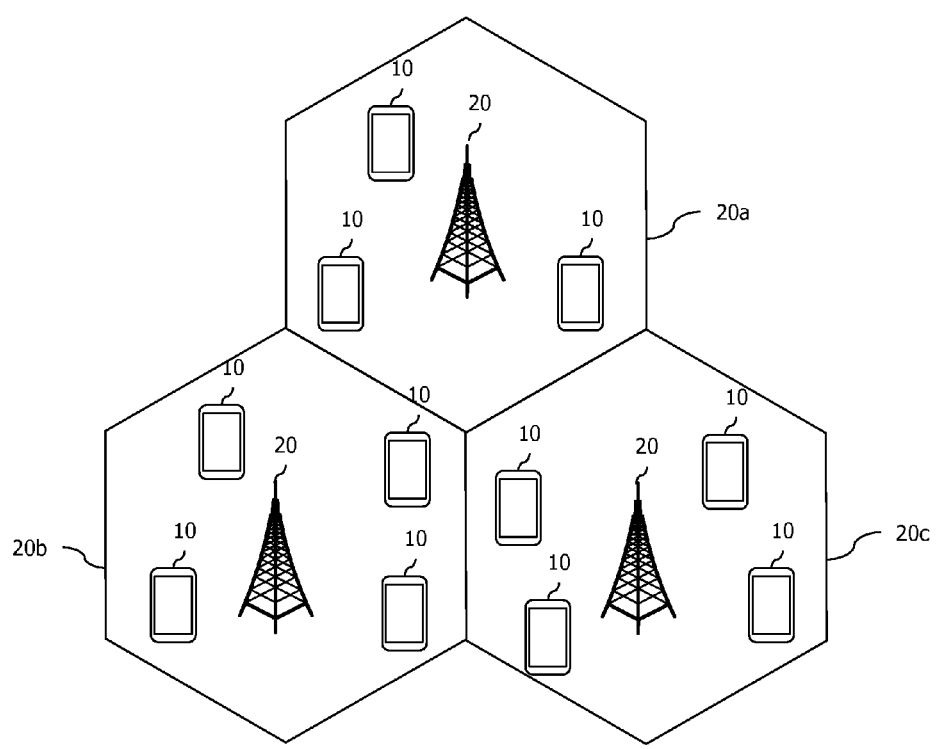
FIG. 1 illustrates a wireless communication system.

FIG. 1 Shows a Wireless Communication System.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
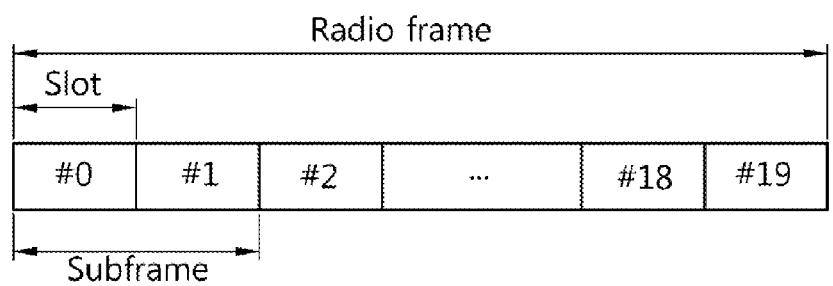
FIG. 2 illustrates a structure of a radio frame according to FDD in 3GPP LTE.

FIG. 2 Shows a Downlink Radio Frame Structure According to FDD of 3Rd Generation Partnership Project (3GPP) Long Term Evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
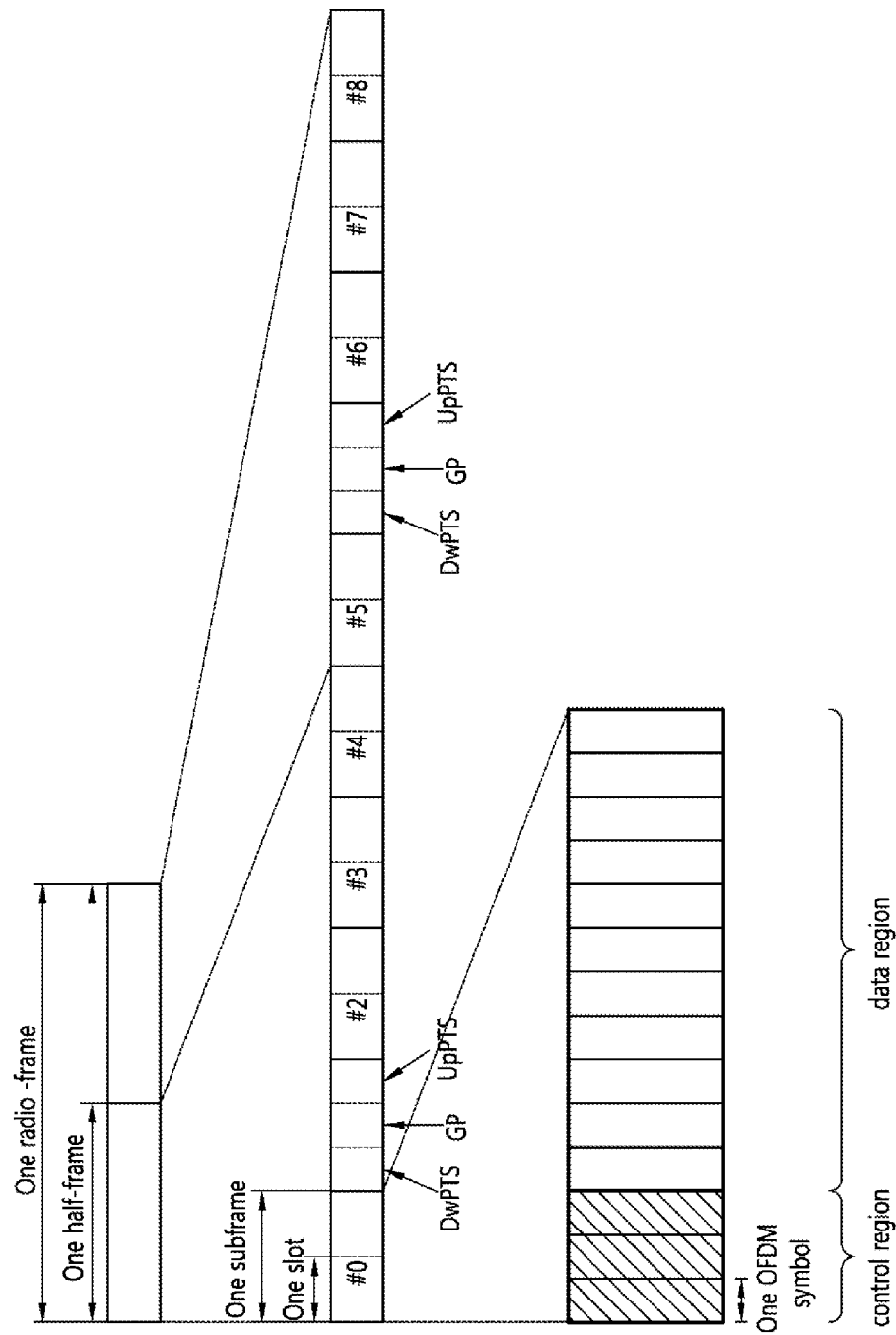
FIG. 3 illustrates a structure of a downlink radio frame according to TDD in 3GPP LTE.

FIG. 3 Illustrates the Architecture of a Downlink Radio Frame According to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | \multicolumn{10}{c}{Subframe index} |||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
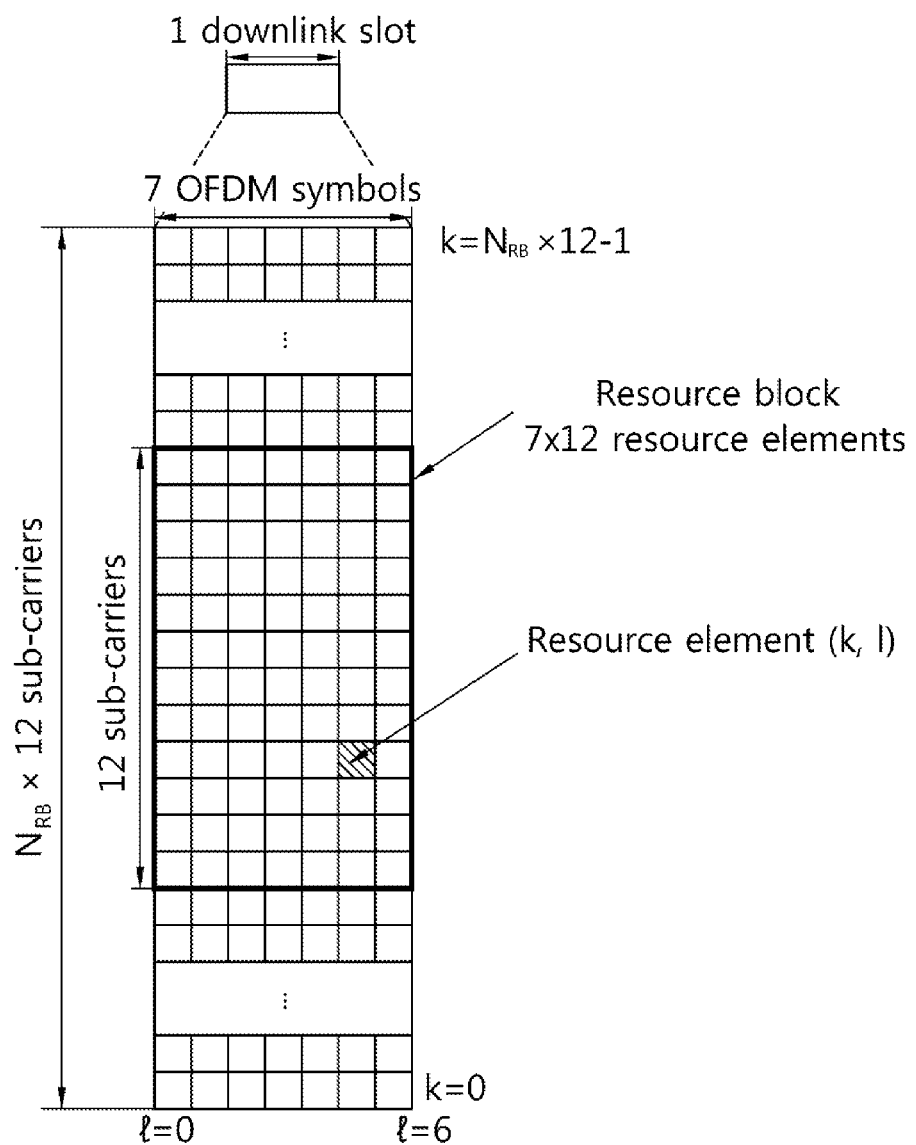
FIG. 4 is an exemplary diagram illustrating a resource grid for one uplink or downlink slot in the 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
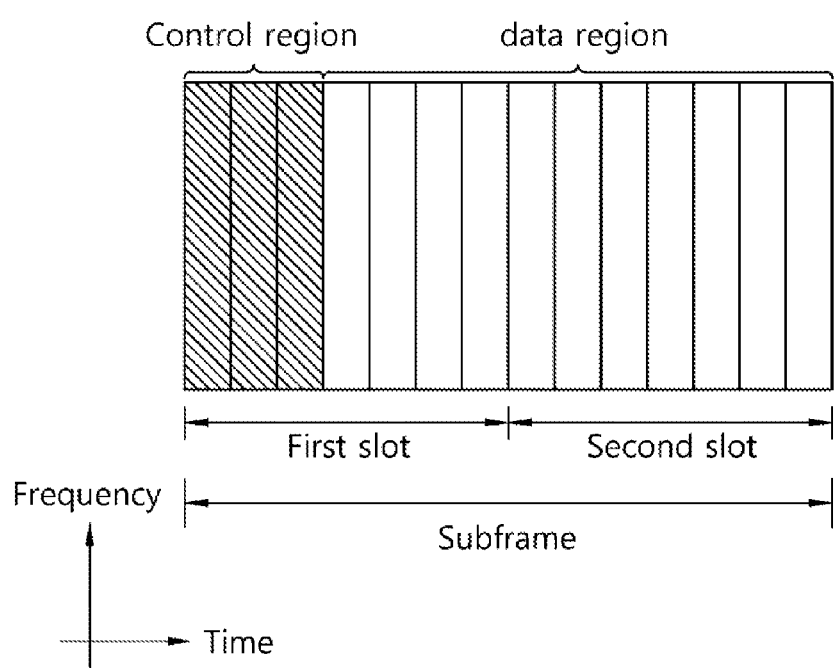
FIG. 5 illustrates a structure of a downlink subframe.

FIG. 5 Illustrates the Architecture of a Downlink Sub-Frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Meanwhile, downlink transmission modes (TMs) between the BS and the UE may be divided into the following nine types. The number of codewords or transmission blocks included in the PDSCH in each subframe may vary according to a downlink TM.

Transmission mode 1: Non-precoding mode (single antenna port transmission mode)

Transmission mode 2: Transmission mode which may be used in two or four antenna ports using space-frequency block coding (SFBC) (transmission diversity)

Transmission mode 3: Open-loop mode which is rank-adaptable based on a rank indication (RI) feedback (open-loop spatial multiplexing). When the rank is 1, transmission diversity may be applied, and when the rank is larger than 1, large delay cyclic delay diversity (CDD) may be used.

Transmission mode 4: Mode in which precoding feedback supporting dynamic rank adaptation is applied (closed-loop spatial multiplexing)

Transmission mode 5: Multi user MIMO

Transmission mode 6: Closed-loop rank 1 precoding

Transmission mode 7: Transmission mode in which a UE-specific reference signal is used.

Transmission mode 8: Dual layer transmission using antenna ports 7 and 8 or single antenna port transmission using antenna port 7 or antenna port 8 (dual layer transmission)

Transmission mode 9: Maximum eight-layer transmission using antenna ports 7 to 14

According to 3GPP TS 36.211 V10.4.0, the uplink channels include a PUSCH, a PUCCH, an SRS (Sounding Reference Signal), and a PRACH (physical random access channel).

Figure 6:
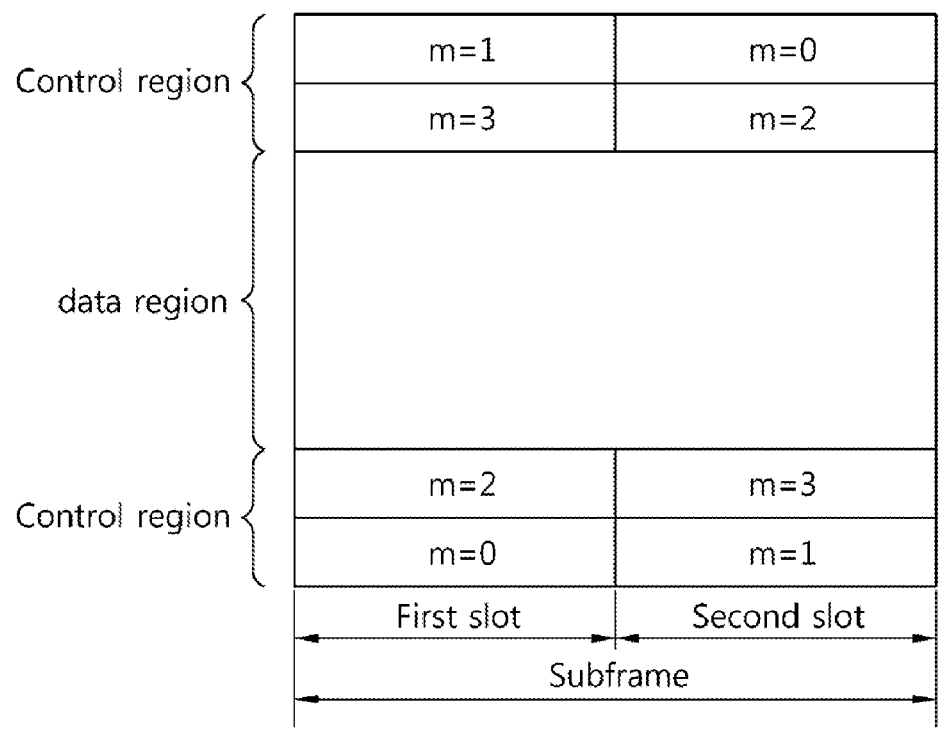
FIG. 6 illustrates a structure of an uplink subframe in the 3GPP LTE.

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
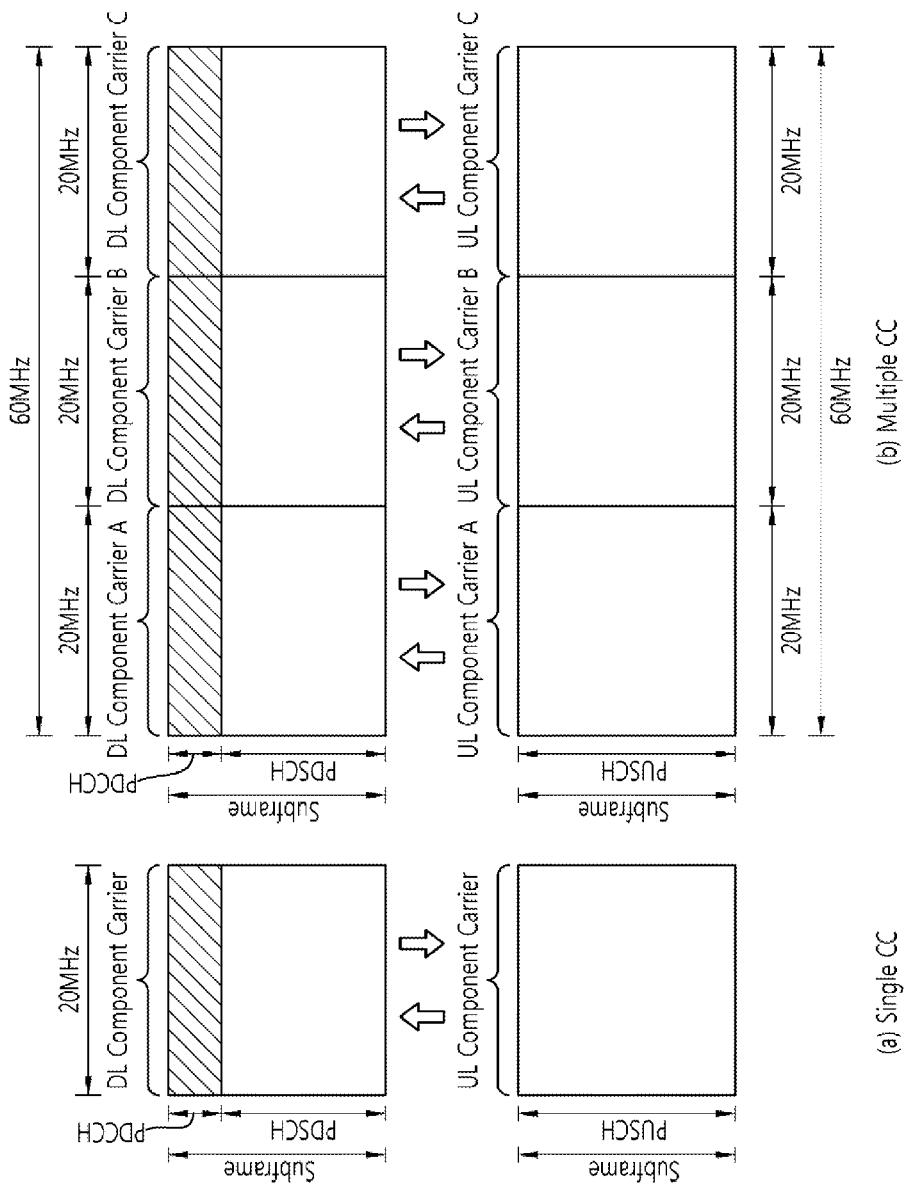
FIG. 7 illustrates a comparative example of a single carrier system in the related art and a carrier aggregation system.

FIG. 7 Illustrates an Example of Comparison Between a Single Carrier System and a Carrier Aggregation System.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
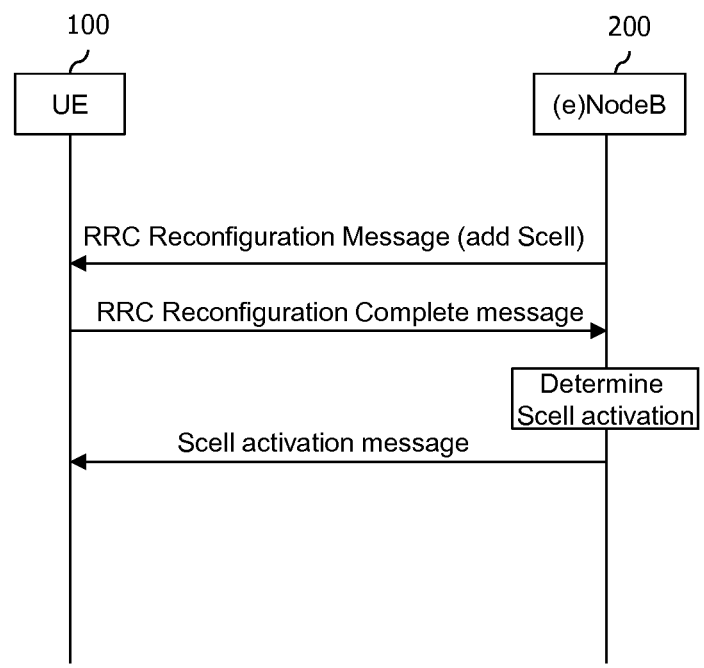
FIG. 8 illustrates an example in which a secondary cell for user equipment is configured and activated by instruction of a base station.

FIG. 8 Illustrates an Example in which a Secondary Cell for User Equipment is Configured and Activated by Instruction of a Base Station.

Referring to FIG. 8, the base station, that is, an (e)NodeB 200 transmits an RRC reconfiguration message to the user equipment, that is, UE 100. A secondary cell, that is, a SCell may be added by the RRC reconfiguration message.

The UE 100 transmits an RRC reconfiguration complete message to the (e)NodeB 200 in response to the RRC reconfiguration message.

The (e)NodeB 200 determines activation of the added secondary cell, that is, the SCell.

If the activation is required, the (e)NodeB 200 transmits the secondary cell, that is, the SCell activation message to the UE 100.

Figure 9:
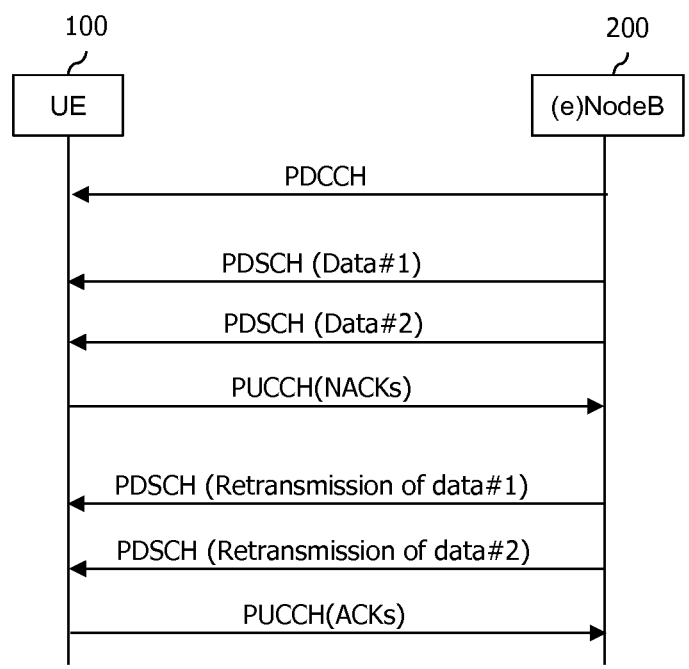
FIG. 9 is an exemplary diagram illustrating an operation of the HARQ between the base station and the user equipment.

FIG. 9 is an Exemplary Diagram Illustrating an Operation of the HARQ Between the Base Station and the User Equipment.

As illustrated in FIG. 9, in the related art, for efficient data transmission, a HARQ operation is performed in the MAC layer, and a detailed HARQ operation process is as follows.

First, the base station, that is, the eNodeB 200 transmits scheduling information (hereinafter, referred to as the scheduling information) through a physical downlink control channel (PDCCH) in order to data to the user equipment, that is, the UE 100 by a HARQ method.

The UE 100 checks scheduling information which is transmitted to the UE 100 by monitoring the control channel, that is, the PDCCH.

When the information for the UE exists by checking the scheduling information, the UE 100 receives data (for example, illustrated data #1 and data #2) from the eNodeB 200 through a physical shared channel (PSCH) at the time associated with the PDCCH.

When the UE 100 receives the data, the UE 100 attempts to decode the data. The UE transmits the HARQ feedback to the eNodeB 200 according to the decoding result. That is, the UE 100 transmits an ACK signal when succeeding in decoding or a NACK signal when failing in decoding, to the eNodeB 200 through the PUCCH or the PUSCH.

When the eNodeB 200 receives the ACK signal, the eNodeB 200 detects that the data transmission to the UE is succeeded and transmits subsequent data.

However, when the eNodeB 200 receives the NACK signal, the eNodeB 200 detects that the data transmission to the UE 100 is failed and retransmits the same data by the same format or a new format at the appropriate time.

The UE 100 transmitting the NACK signal attempts to receive the retransmitted data.

When the UE 100 receives the retransmitted data, the UE 100 combines the retransmitted data with the data which previously fails in decoding to be stored in the buffer by various formats to attempt to decode the data again, and transmits an ACK signal when succeeding in decoding or a NACK signal when failing in decoding, to the eNodeB 200 through the PUCCH or the PUSCH. The UE 100 repeats processes of transmitting the NACK signal and retransmitting the data until succeeding in decoding of the data.

Hereinabove, the HARQ in a downward direction, that is, a direction from the eNodeB 200 to the UE 100 is described.

However, a synchronous HARQ is used in an upward direction, that is, a direction from the UE 100 to the eNodeB 200. Here, the synchronous HARQ means a case where time intervals are the same as each other during transmission of the data. That is, when the UE performs any transmission and then performs the retransmission for the transmission, the retransmission occurs after a predetermined time of the previous transmission. There are effects on reducing waste of radio resources caused when the scheduling information is necessarily transmitted by using the PDCCH every transmission time and reducing the risk that the UE fails to correctly receive the PDCCH and does not perform the appropriate retransmission.

Figure 10:
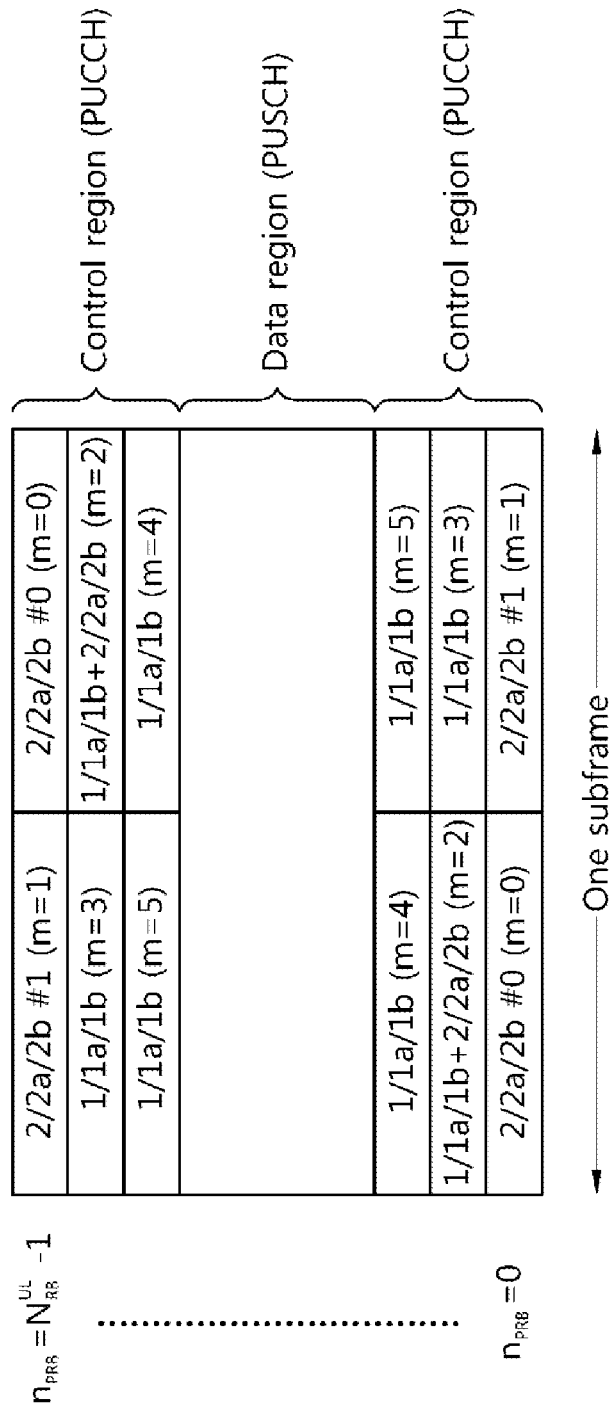
FIG. 10 illustrates a PUCCH and a PUSCH on an uplink subframe.

FIG. 10 Illustrates a PUCCH and a PUSCH on an Uplink Subframe.

PUCCH formats will be described with reference to FIG. 10.

Uplink control information (UCI) may be transmitted to the PUCCH. In this case, the PUCCH transports various types of control information according to a format. The UCI includes a HARQ ACK/NACK, a scheduling request (SR), and channel status information (CSI) representing a downlink channel status.

PUCCH format 1 transports the scheduling request (SR). In this case, an on-off keying (OOK) scheme may be applied. PUCCH format 1a transports an acknowledgement/non-acknowledgment (ACK/NACK) modulated by a binary phase shift keying (BPSK) scheme with respect to one codeword. PUCCH format 1b transports an ACK/NACK modulated by a quadrature phase shift keying (QPSK) scheme with respect to two codewords. PUCCH format 2 transports a channel quality indicator (CQI) modulated by the QPSK scheme. PUCCH formats 2a and 2b transport the CQI and the ACK/NACK.

The following Table represents PUCCH formats.

TABLE 2

| Format | Description |
| --- | --- |
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 9) of a band edge allocated to the UE to be transmitted. A mixed PUCCH RB may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

As such, the PUCCH is used only in the transmission of the UCI. To this end, the PUCCH supports multiple formats. PUCCHs having different number of bits for each subframe may be used according to a modulation scheme subordinate to the PUCCH format.

Meanwhile, in the case of carrier aggregation, the number of bits for the ACK/NACK of the HARQ is determined by considering the configured secondary cell as well as the primary cell.

Figure 11:
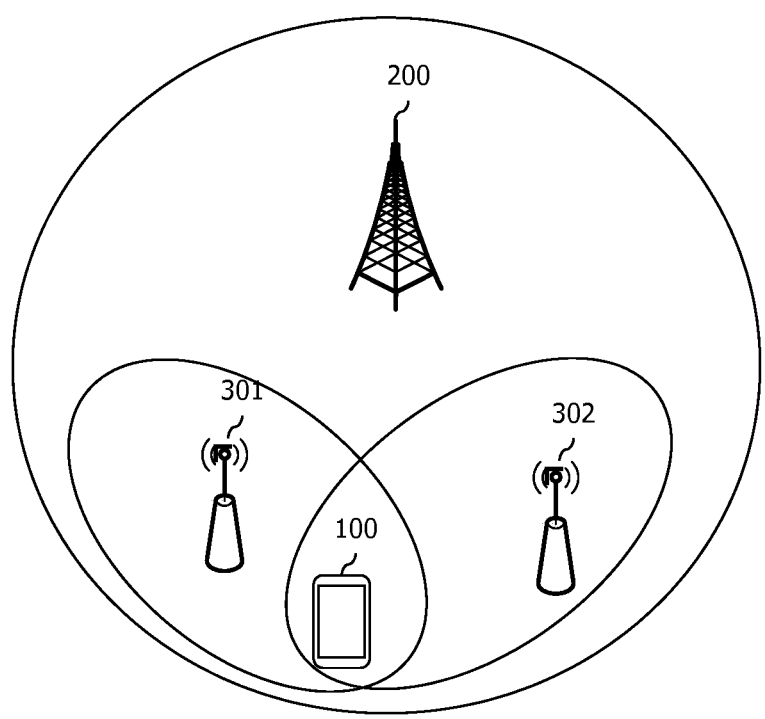
FIG. 11 illustrates a concept of a small cell which is recently under discussion.

FIG. 11 Illustrates a Concept of a Small Cell which is Recently Under Discussion.

As illustrated in FIG. 11, recently, in order to more improve performance and fill a gap in coverage, an orientation is being discussed, in which a plurality of small cells 301 and 302 such as pico cells is positioned in the coverage of the eNodeB 200 corresponding to an existing macro cell.

In such an environment, in order to more facilitate the mobility management of the UE 100, the macro cell is configured as the primary cell, and the small cell may be configured as the secondary cell.

However, the small cells 301 and 302 may be disposed by mobile carriers, but may be disposed by users to be disposed in a predetermined region with higher density than necessary. In this case, the eNodeB 200 corresponding to the macro cell does not determine which cell of the small cells 301 and 302 corresponds to a more suitable secondary cell for the UE 100 and thus there is high possibility that the eNodeB 200 configures small cells 301 and 302 as much as possible as the secondary cells. As a result, configuration/release and activation/deactivation of the secondary cell may very frequently occur.

Under such an environment, as described above, it may be inefficient that the number of bits for the HARQ ACK/NACK is always determined by considering up to the configured secondary cells. For example, the eNodeB 200 may additionally configure many secondary cells for the purpose of replacing the current configured secondary cells later, and in this case, the number of bits for the HARQ ACK/NACK is always determined by considering up to the configured secondary cells, the resources are configured according the determined number of bits, and as a result, the resources may be wasted.

Accordingly, hereinafter, according to the purpose of configuring the secondary cell, the channel state, and the situation of the UE, a method of efficiently configuring bits for the HARQ-ACK/NACK will be proposed.

Figure 12:
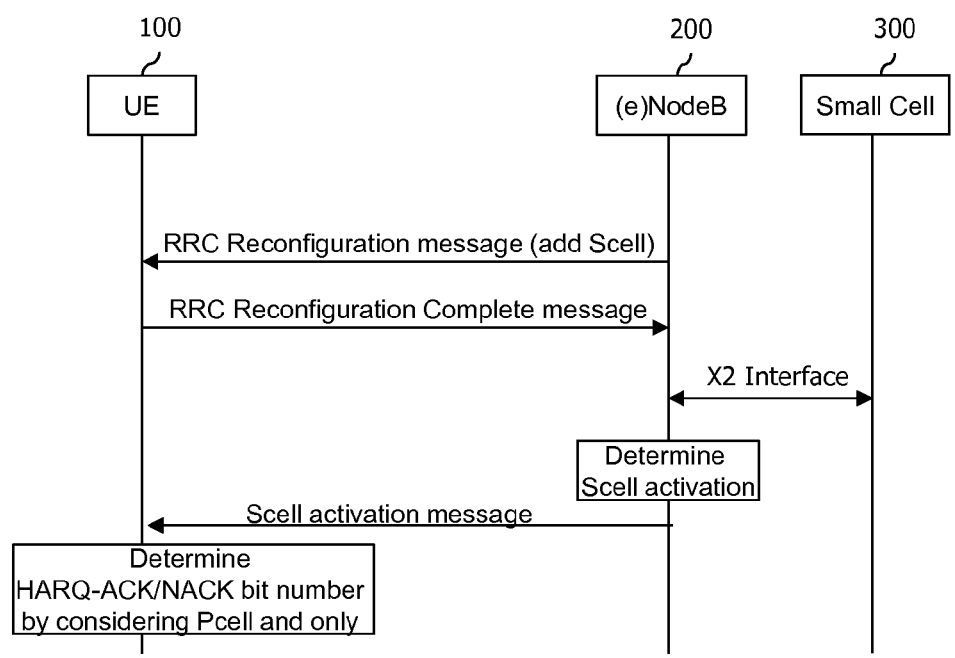
FIG. 12 is a flowchart illustrating a method according to an embodiment proposed in this specification.

FIG. 12 is a Flowchart Illustrating a Method According to an Embodiment Proposed in this Specification.

As illustrated in FIG. 12, as an example of the method of efficiently configuring the number of bits for the HARQ-ACK/NACK, the number of bits for the HARQ-ACK/NACK may be determined by considering the primary cell and only the activated secondary cell (Scell).

In detail, referring to FIG. 12, the eNodeB 200 corresponding to the primary cell (Pcell) transmits the RRC reconfiguration message to the UE 100 to configure many Scells.

The (e)NodeB 200 determines activation of any secondary cell among the added SCells.

If the activation is required, the (e)NodeB 200 transmits an activation message for the determined SCell to the UE 100.

Then, the UE 100 may determine the number of bits for the HARQ-ACK/NACK by considering the primary cell and only the activated secondary cell, without considering all of many configured secondary cells.

Figure 13:
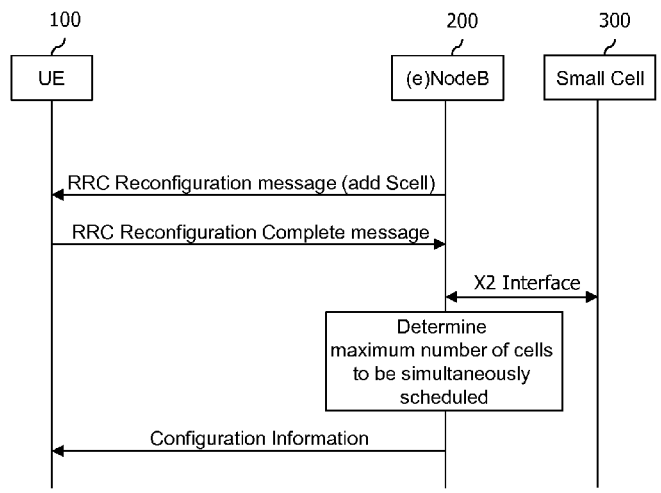
FIG. 13 is a flowchart illustrating a method according to another embodiment proposed in this specification.

FIG. 13 is a Flowchart Illustrating a Method According to Another Embodiment Proposed in this Specification.

As illustrated in FIG. 13, as an example of a method of efficiently configuring the number of bits of the HARQ-ACK, the number of bits of the HARQ-ACK/NACK may be determined according to the maximum number of cells which may be simultaneously scheduled. Meanwhile, the UE 100 may allocate only a predetermined number of bits for the HARQ-ACK/NACK for each downlink subframe to each cell.

In detail, referring to FIG. 13, the eNodeB 200 corresponding to the macro cell transmits the RRC reconfiguration message to the UE 100 to configure many secondary cells. The UE 100 transmits an RRC reconfiguration complete message to the (e)NodeB 200 in response to the RRC reconfiguration message.

Subsequently, the eNodeB 200 corresponding to the macro cell determines the maximum number of cells which may be simultaneously scheduled among many small cells to transmit the configuration information to the UE 100. An instruction to allocate only the predetermined number (for example, two) of bits per downlink subframe for each cell for the HARQ-ACK/NACK may be included in the configuration information. Alternatively, an instruction to allocate only the predetermined number (for example, two) of bits for each cell for the HARQ-ACK/NACK may be included in the configuration information.

Meanwhile, the eNodeB 200 corresponding to the macro cell is connected with many small cells 300 through an X2 interface to exchange information on the maximum number of cells which may be simultaneously scheduled.

Figure 14:
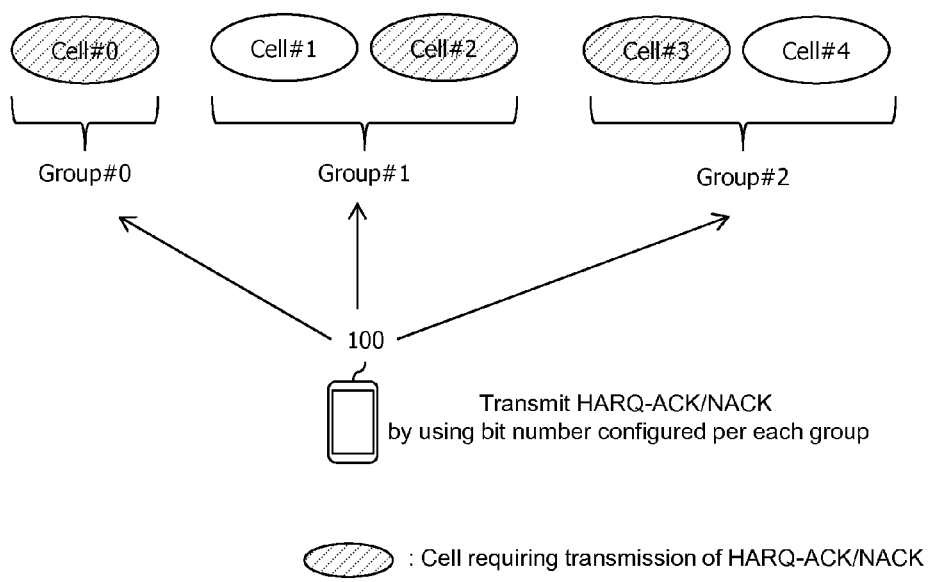
FIG. 14 is an exemplary diagram illustrating a method according to yet another embodiment proposed in this specification.

FIG. 14 is an Exemplary Diagram Illustrating a Method According to Yet Another Embodiment Proposed in this Specification.

As illustrated in FIG. 14, as another method of efficiently determining the number of bits of the HARQ-ACK, the cells configured as the secondary cells are grouped and the number of bits of the HARQ-ACK/NACK may be determined for each group.

In detail, as illustrated in FIG. 13, it assumed that cell #0, cell #1, cell #2, cell #3, and cell #4 are configured as the secondary cells by the primary cell. In addition, cell #0, cell #2, and cell #3 are cells scheduling the resources in order to transmit the downlink data, and it is assumed that the UE 100 needs to transmit the HARQ-ACK/NACK for the downlink data. On the other hand, cell #1 and cell #4 are non-scheduled cells. In this case, cell #0 may be grouped into group #0, cell #1 and cell #2 may be grouped into group #2, and cell #3 and cell #4 may be grouped into group #3. In this case, the UE 100 may transmit the HARQ-ACK/NACK by using the number of bits configured for each group.

Meanwhile, the primary cell statically specifies the group in advance to notify the specified group to the UE 100. Alternatively, the primary cell dynamically configures the group and then may dynamically notify information on the group to the UE 100 through signaling of the higher layer. The information on the group may include the maximum number of cells (may include the primary cell) which may be simultaneously scheduled to the corresponding UE and information on cells configuring the group. The information on the cells configuring the group may include an index of serving cells or an index of secondary cells.

Meanwhile, as such, whether number of bits for the HARQ-ACK/NACK is configured for each group or configured for each cell may be dynamically notified to the UE 100 through signaling of the higher layer.

On the other hand, in cells included in each cell, carrier frequencies, band widths, transmission modes (TMs), and the like may not be the same as each other. For example, even when the number of transport blocks (TBs) of cell #1 illustrated in FIG. 13 and the number of TBs of cell #2 are different from each other, the two cells are simply grouped into the group #1 and then the number of bits for the HARQ-ACK/NACK is arbitrarily configured with respect to the group #1, and as a result, the problems may be caused.

In addition, due to many reasons, in order to configure the number of bits for the HARQ-ACK/NACK for each group, the configuration needs to be performed by additional considerations. Detailed examples will be described below.

As a first exemplary method, grouping cells of which TMs coincide with each other or grouping only the cells using TM series having the same maximum codeword number may be considered.

As a second exemplary method, in the case where the cells are grouped, when the number of bits for the HARQ- ACK/NACK is configured for each group, the number of downlink subframes may be considered. That is, the number of bits for the HARQ-ACK/NACK for each group is configured by considering a total sum of N bits per downlink subframe. Here, the N may be a pre-fixed value (for example, two) or a value which is dynamically set by the signaling of the higher layer.

As a third exemplary method, in the case where the cells are grouped, the number of bits for the HARQ-ACK/NACK for each group is configured based on a case where the number of TBs for each cell is largest.

As a fourth exemplary method, the number of bits for the HARQ-ACK/NACK for each group is configured based on the number of TBs of the activated secondary cell. In this case, the number of TBs may be the maximum number of TBs corresponding to TBs in which the activated cells are used.

As a fifth exemplary method, the number of bits for the HARQ-ACK/NACK for each group is configured based on the TB information of cells which schedule the resources for the downlink data in the group. In the case where there is no scheduled information in the group, a default value is applied to the group. The default value may be predetermined (e.g. 2) or dynamically configured by the higher layer.

Meanwhile, the TB number (alternatively, the CW number) per downlink subframe scheduled in the activated secondary cell and the HARQ-ACK/NACK number of bits per downlink subframe according to the example described above may be actually different from each other. For example, there are a case where the actual TB number is 2 and the configure HARQ-ACK number of bits is 1 and a case where the actual TB number is 1 and the configure HARQ-ACK number of bits is 2. In this case, when the TB number is 2 and the HARQ-ACK number of bits per downlink subframe of the corresponding group is 1, the UE may perform spatial bundling. When the TB number is 1 and the HARQ-ACK number of bits per configured DL SF is 2, the UE may configure the ACK as (ACK, ACK) or (ACK, DTX) and the NACK as (NACK, NACK) or (NACK, DTX).

Additionally, in the case of TDD, the cells included in each group may use different UL-DL configurations. In this case, the number of downlink subframes for each cell and HARQ-ACK timing may be varied. In addition, due to many reasons, in the case of TDD, in order to configure the number of bits for the HARQ-ACK/NACK for each group, the configuration needs to be performed by additional considerations. Detailed examples will be described below.

As a first exemplary method, cells having the same cell-specific configuration are grouped or cells having the configuration corresponding to the same reference configuration are grouped.

As a second exemplary method, when UL-DL configurations are different between the cells included in the group, a case where the most downlink subframes are included is determined as a reference and then used when calculating the HARQ-ACK number of bits and determining the HARQ-ACK timing.

As a third exemplary method, with respect to UL-DL configurations for the cells included in the group, the downlink for each subframe is determined based on a configuration generated through a reference union to be used when calculating the HARQ-ACK number of bits and determining the HARQ-ACK timing.

As a fourth exemplary method, the UL-DL configuration which is based on the calculating of the HARQ-ACK number of bits and the determining of the HARQ-ACK timing is notified to the UE 100 through signaling of the higher layer.

As a fifth exemplary method, the UL-DL configuration for the activated cell in the group is configured as the reference to be used when calculating the HARQ-ACK number of bits and determining the HARQ-ACK timing.

As a sixth exemplary method, the UL-DL configuration is directly assigned for each uplink subframe. The assigning method may consider a method configured or pre-assigned in an upper system. In the above exemplary methods, when the UL-DL configuration selected based on the group and the UL-DL configuration for the Pcell are different from each other, a technique related with the different TDDs may be applied as it is hereinafter.

As described above, the number of bits for the HARQ-ACK/NACK is not allocated by considering all the secondary cells configured by the primary cell, but allocated for each group to more efficiently use the resources.

Meanwhile, according to the methods described with reference to FIGS. 12 to 14, when the HARQ-ACK/NACK number of bits is determined, the UE 100 transmits the HARQ-ACK/NACK according to a PUCCH format suitable for the determined number of bits. The PUCCH format may be, for example, PUCCH format 1b or 3.

Hereinafter, an example in which the UE 100 transmits the HARQ-ACK/NACK for each group by using the PUCCH format 3 will be described.

Figure 15:
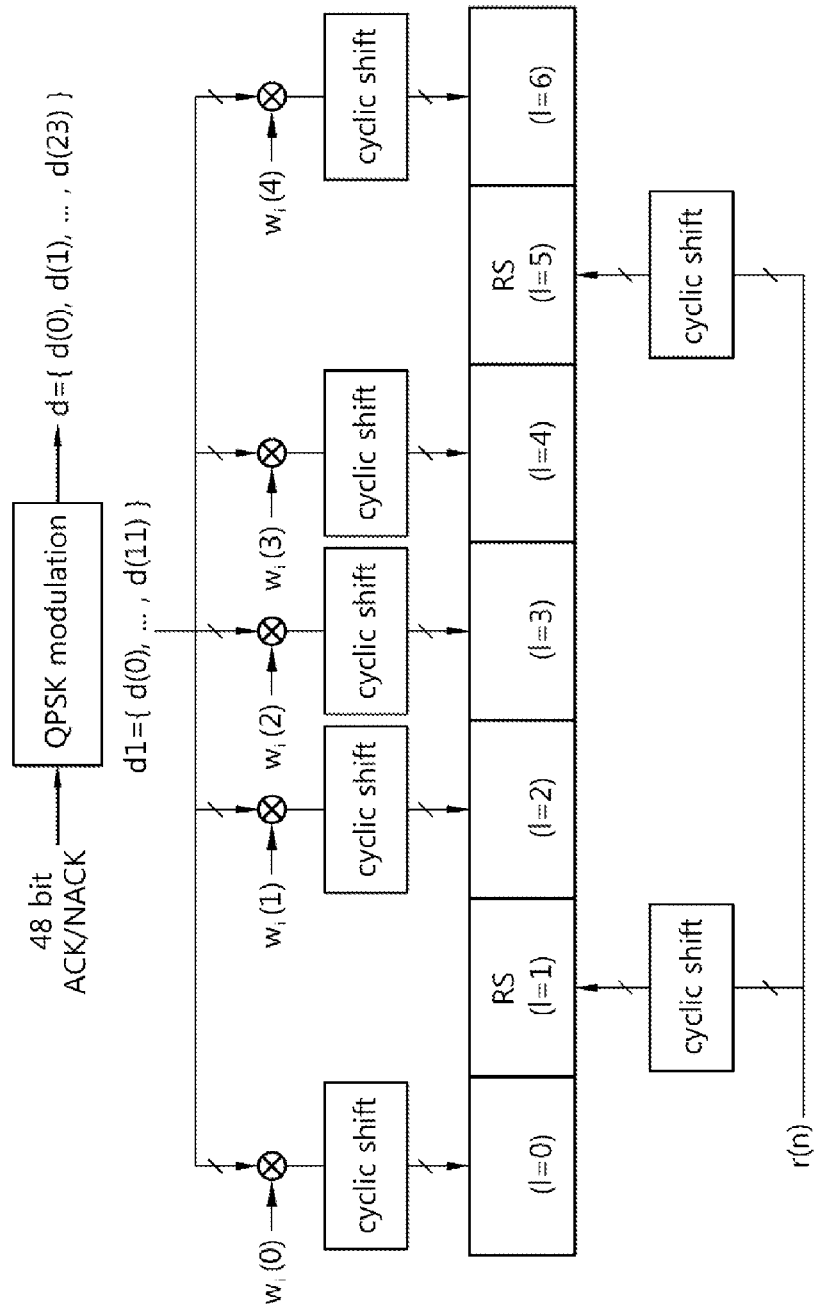
FIG. 15 is an exemplary diagram illustrating a structure of a PUCCH format 3 in a normal CP.

FIG. 15 is an Exemplary Diagram Illustrating a Structure of a PUCCH Format 3 in a Normal CP.

As the plurality of serving cells are used, PUCCH format 3 is additionally introduced in addition to the PUCCH format of the existing 3GPP LTE, against deficiency in the number of bits required to transmit the UCI.

One slot includes 7 OFDM symbols and 1 has values of 0 to 6 as OFDM symbol numbers in the slot. Two OFDM symbols in which l=1 and 5 becomes RS OFDM symbols for a reference signal and residual OFDM symbols become data OFDM symbols for a UCI signal.

48 encoded UCI (e.g., encoded ACK/NACK) is quadrature phase-shift keying (QPSK)-modulated to generate a symbol sequence $d=\{d(0), d(1), \ldots, d(23)\}$. $d(n)(n=0, 1, \ldots, 23)$ is a complex-valued modulated symbol. The symbol sequence d may be an aggregation of modulated symbols. The number of bits or a modulation scheme of the UCI is just an example and the present invention is not limited thereto.

One PUCCH uses 1 RB and one subframe includes a first slot and a second slot. The symbol sequence $d=\{d(0), d(1), \ldots, d(23)\}$ is divided into two sequences $d1=\{d(0), \ldots, d(11)\}$ and $d2=\{d(12), \ldots, d(23)\}$ which have a length of 12, and the first sequence d1 is transmitted in the first slot and the second sequence d2 is transmitted in the second slot. FIG. 4 illustrates that the first sequence d1 is transmitted in the first slot.

The symbol sequence is diffused to an orthogonal sequence wi. The symbol sequence corresponds to each data OFDM symbol and the orthogonal sequence is used to distinguish the PUCCH (alternatively, the UE) by diffusing the symbol sequence throughout the data OFDM symbols.

The orthogonal sequence has a diffusion coefficient of K=5 and includes 5 elements. As the orthogonal sequence, one of 5 orthogonal sequences of the following table may be selected according to an orthogonal sequence index i.

TABLE 3

| Index (i) | [$w_i(0)$, $w_i(1)$, $w_i(2)$, $w_i(3)$, $w_i(4)$] |
|---|---|
| 0 | [+1, +1, +1, +1, +1] |
| 1 | [+1, $e^{j2\pi/5}$, $e^{j4\pi/5}$, $e^{j6\pi/5}$, $e^{j8\pi/5}$] |
| 2 | [+1, $e^{j4\pi/5}$, $e^{j8\pi/5}$, $e^{j2\pi/5}$, $e^{j6\pi/5}$] |
| 3 | [+1, $e^{j6\pi/5}$, $e^{j2\pi/5}$, $e^{j8\pi/5}$, $e^{j4\pi/5}$] |
| 4 | [+1, $e^{j8\pi/5}$, $e^{j6\pi/5}$, $e^{j4\pi/5}$, $e^{j2\pi/5}$] |

Two slots in the subframe may use different orthogonal sequence indexes.

A reference signal sequence used for demodulating the UCI is mapped and transmitted to two RS OFDM symbol.

Channel coding for PUCCH format 3 will be described below.

UCI (e.g., CSI) u0, u1, . . . , uA−1 (A represents the number of bits of the UCI) is channel-coded, and as a result, the encoded bit sequence $q_0, q_1, \ldots, q_{B-1}$ is generated. B represents the number of bits which may be transmitted by the corresponding PUCCH and since PUCCH format 3 may transmit 48-bit coded UCI, B=48.

PUCCH format 3 may transmit a maximum of 48 bits, but the channel coding uses a basis sequence for a (32, A) block code of Table 1. Accordingly, the channel coding is as follows by considering whether the number of UCI bits, A is larger than the number of RM bases (alternatively, also referred to as the basis sequence). The number of RM bases is 11.

If A<=11, it is as follows.

An intermediate sequence for the channel coding, $b_0, b_1, \ldots, b_{31}$ is generated as follows.

$$b_i = \sum_{n=0}^{A-1} (u_n \cdot M_{i,n}) \bmod 2 \quad \text{[Equation 1]}$$

Where, i=0, 1, . . . , 31 and $M_{i,n}$ represents a basis sequence for (32, O) for Table 1.

A control information bit sequence $q_0, q_1, \ldots, q_{B-1}$ is generated by cyclically repeating the intermediate sequence $b_0, b_1, \ldots, b_{31}$ as follows.

$$q_i = b_{(i \bmod 32)} \quad \text{[Equation 2]}$$

Where, i=0, 1, . . . , B−1.

If 11<A<=21, it is as follows.

Two intermediate sequence $b^1_i$, $b^2_i$ is generated as follows.

$$b^1_i = \sum_{n=0}^{\lceil A/2 \rceil - 1} (u_n \cdot M_{i,n}) \bmod 2,$$

$$b^2_i = \sum_{n=0}^{A-\lceil A/2 \rceil - 1} (u_{\lceil A/2 \rceil + n} \cdot M_{i,n}) \bmod 2 \quad \text{[Equation 3]}$$

Where, i=0, 1, . . . , 23.

The control information bit sequence q0, q1, . . . , qB−1 is generated by concatenating the intermediate sequences as follows.

$$q_i = b^1_j, q_{i+1} = b^1_{j+1}, q_{i+2} = b^2_j, q_{i+4} = b^2_{j+1} \quad \text{[Equation 4]}$$

When A<=11, since one RM block code (alternatively, one RM encoder) is used, this is referred to as single RM. When A>11, since two RM block codes (alternatively, two RM encoders) are used, this is referred to as dual RM.

Transmission by the dual RM coding will be described below with reference to FIG. 16.

Figure 16:
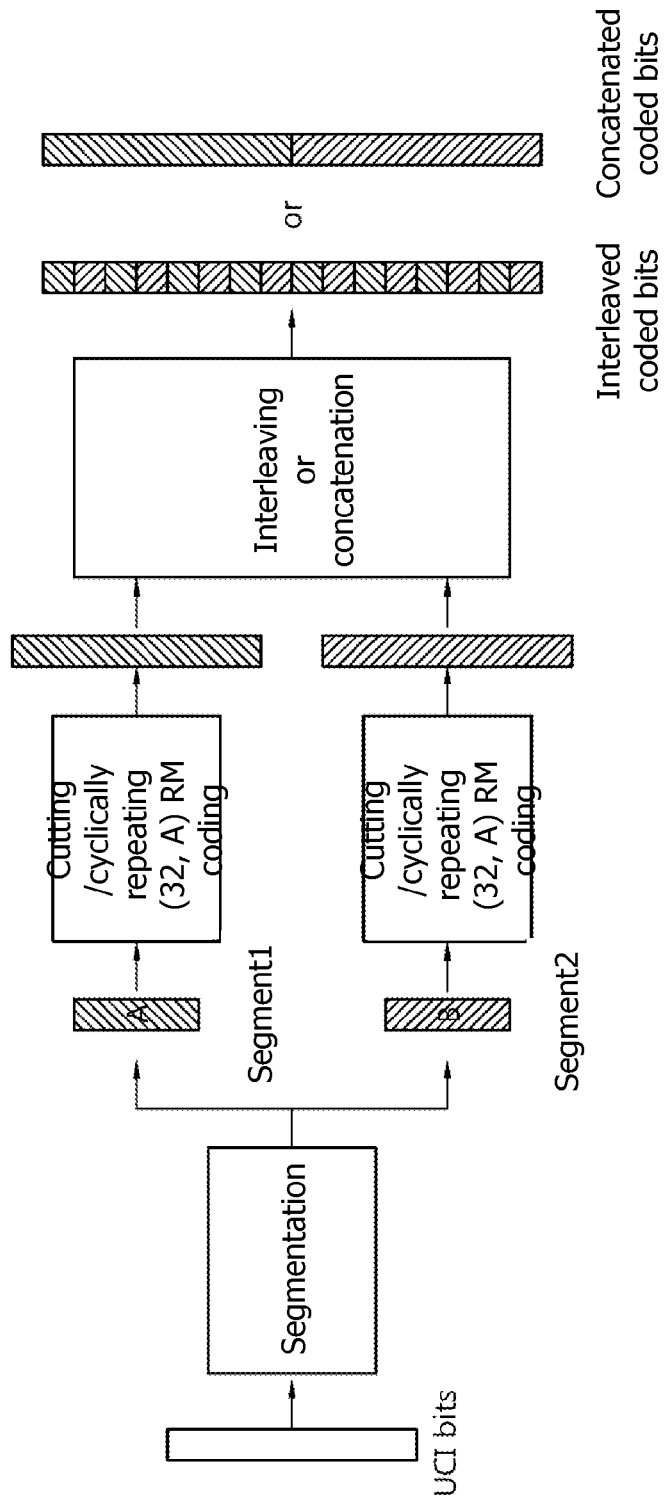
FIG. 16 exemplifies a dual RM coding process.

FIG. 16 Exemplifies a Dual RM Coding Process.

Referring to FIG. 16, when a UCI bit stream (information bits) is more than 11 bits, a bit stream (referred to as a segment) segmented through segmentation is generated. In this case, each of segment 1 and segment 2 becomes 11 bits or less. The segments 1 and 2 are interleaved or concatenated through the (32, A) RM code. Thereafter, the UCI bit stream is truncated or circularly repeated in order to match the coded number of bits of the PUCCH format 3.

The exemplary embodiments of the present invention which has been described up to now may be implemented through various means. For example, the exemplary embodiments of the present invention may be implemented by hardware, firmware, software, or combinations thereof.

Figure 17:
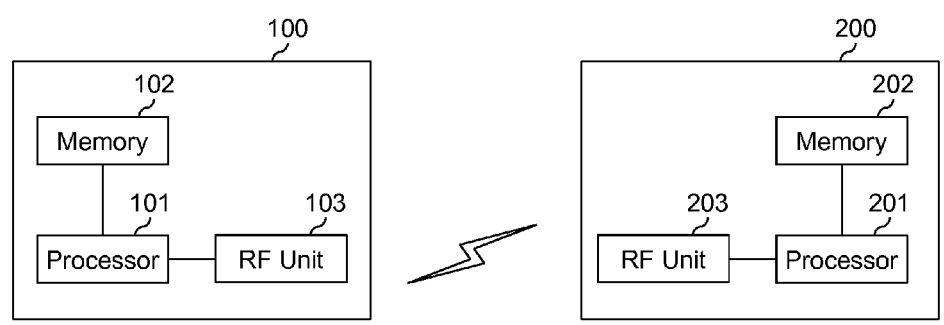
FIG. 17 is a block diagram illustrating a wireless communication system in which an exemplary embodiment of the present invention is implemented.

FIG. 17 is a Block Diagram Illustrating a Wireless Communication System in which the Exemplary Embodiment of the Present Invention is Implemented.

The base station 200 includes a processor 201, a memory 202, and an RF (radio frequency) unit 203. The memory 202 is connected with the processor 201 and stores various pieces of information for driving the processor 201. The RF unit 203 is connected with the processor 201 and transmits and/or receives radio signals. The processor 201 implements functions, processes, and/or methods as suggested herein. In the above-described embodiments, the operation of the base station may be implemented by the processor 201.

The wireless device 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements functions, processes, and/or methods as suggested herein. In the above-described embodiments, the operation of the wireless device may be implemented by the processor 101.

The processor may include an ASIC (application-specific integrated circuit), other chipsets, a logic circuit, and/or a data processing device. The memory may include an ROM (read-only memory), an RAM (random access memory), a flash memory, a memory card, a storage medium, and/or other storage devices. The RF unit may include a baseband circuit for processing radio signals. When an embodiment is implemented in software, the above-described schemes may be realized in modules (processes, or functions) for performing the above-described functions. The modules may be stored in the memory and executed by the processor. The memory may be positioned in or outside the processor and may be connected with the processor via various well-known means.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention. The present invention may be used in a user equipment, a base station, or other equipment of a wireless mobile communication system.

What is claimed is:

1. A method for performing HARQ in carrier aggregation, the method comprising:

receiving configuration information for a plurality of cell groups for configuring a HARQ ACK/NACK, each of the plurality of cell groups including one or a plurality of serving cells;

allocating the number of bits of the HARQ ACK/NACK by a cell group unit according to the configuration information; and transmitting the HARQ ACK/NACK for the corresponding cell group according to the number of bits of the allocated HARQ ACK/NACK, wherein the each of the plurality of groups is grouped by Transmission Mode (TM) series having the same maximum codeword number.

2. The method of claim 1, wherein in the transmitting, the HARQ-ACK/NACK is transmitted by using the PUCCH format suitable for the number of bits.

3. The method of claim 1, wherein the configuration information is received through an RRC signal.

4. The method of claim 1, wherein the serving cells included in the group do not simultaneously schedule resources for the uplink data.

5. The method of claim 1, wherein in the allocating, N bits per downlink subframe for the HARQ-ACK/NACK are considered with respect to each group.

6. The method of claim 1, wherein in the allocating, the number of bits is allocated by considering the largest number among numbers of transport blocks of cells included in each group.

7. The method of claim 1, wherein in the allocating, the number of bits is allocated by considering the activated cell among the cells included in each group.

8. The method of claim 1, wherein in the allocating, in the case of TDD, the number of bits is allocated by considering a cell having the most number of downlink subframes.

9. The method of claim 1, wherein the HARQ ACK/NACK is transmitted on one uplink channel for each cell group.

10. The method of claim 1, wherein the HARQ ACK/NACK is transmitted onto one uplink channel for each cell group.

11. The method of claim 1, wherein one cell group of the plurality of cell groups includes a primary cell and other cell groups include secondary cells.

12. An user equipment (UE) for performing HARQ in carrier aggregation, the UE comprising:

an RF unit configured to receive configuration information for a plurality of cell groups for configuring a HARQ ACK/NACK, each of the plurality of cell groups including one or a plurality of serving cells; and a processor configured to allocate the number of bits of the HARQ ACK/NACK by a cell group unit according to the configuration information and transmit the HARQ ACK/NACK for the corresponding cell group according to the number of bits of the allocated HARQ ACK/NACK, wherein the each of the plurality of groups is grouped by Transmission Mode (TM) series having the same maximum codeword number.

* * * * *